Patented Sept. 15, 1925.

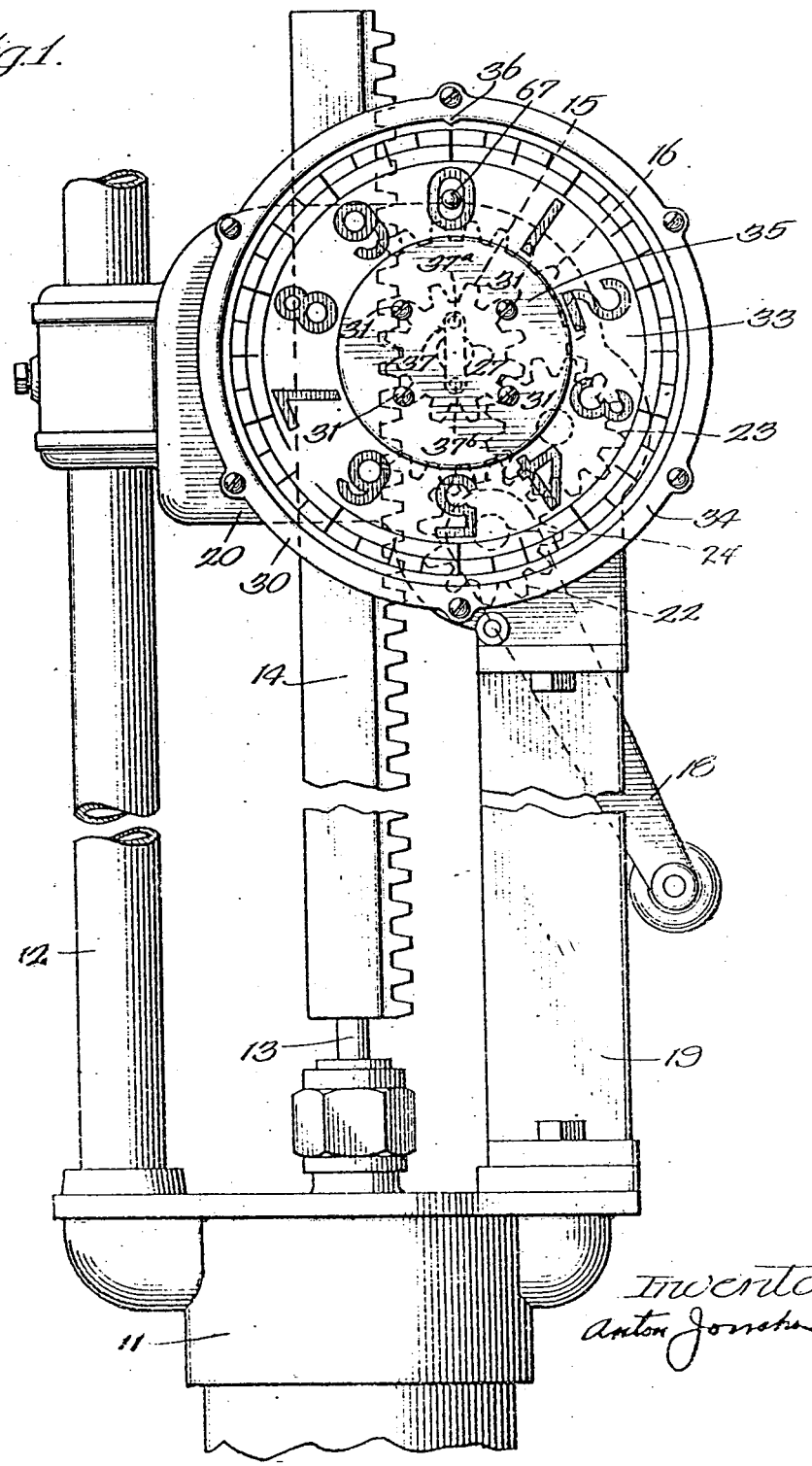

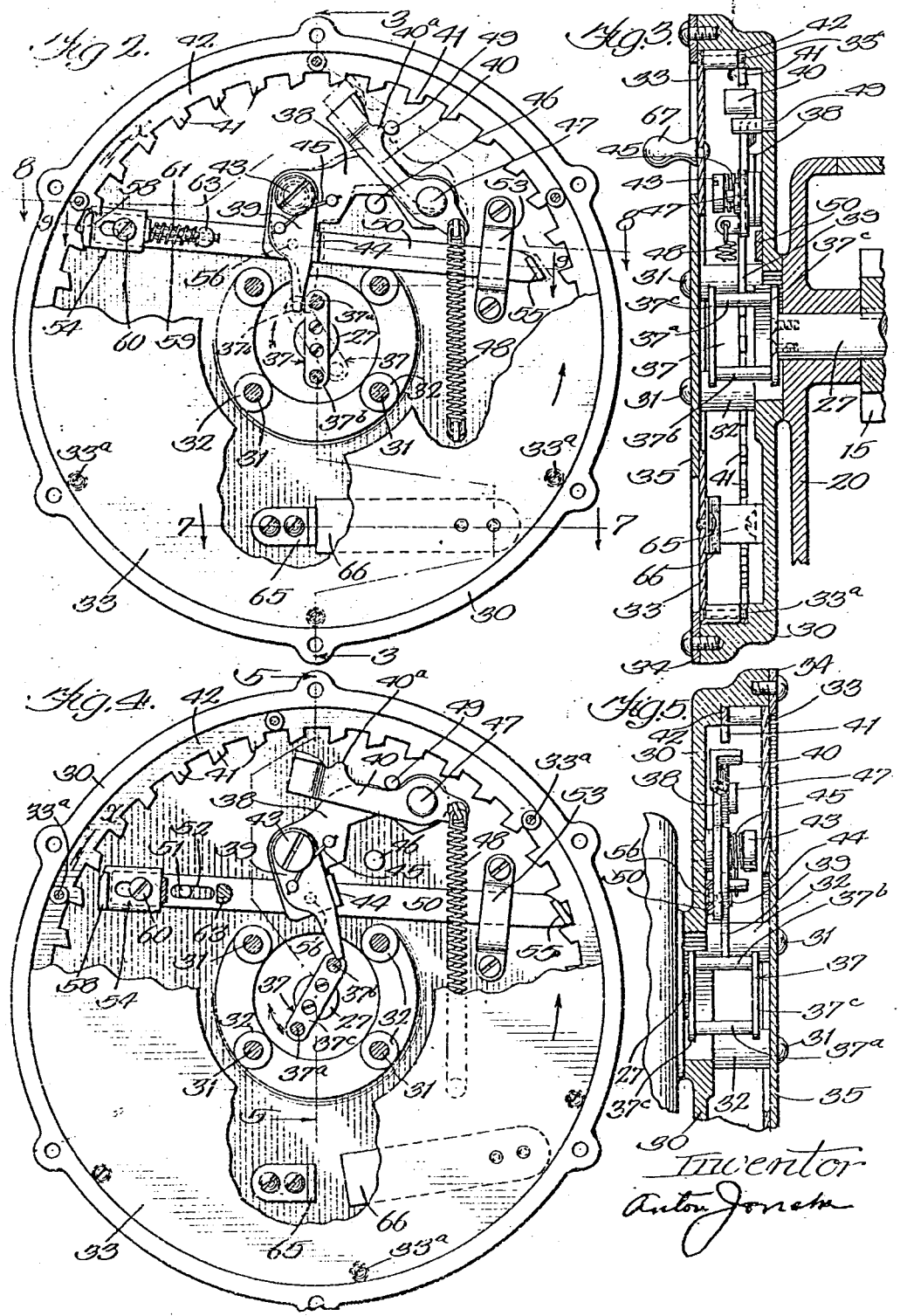

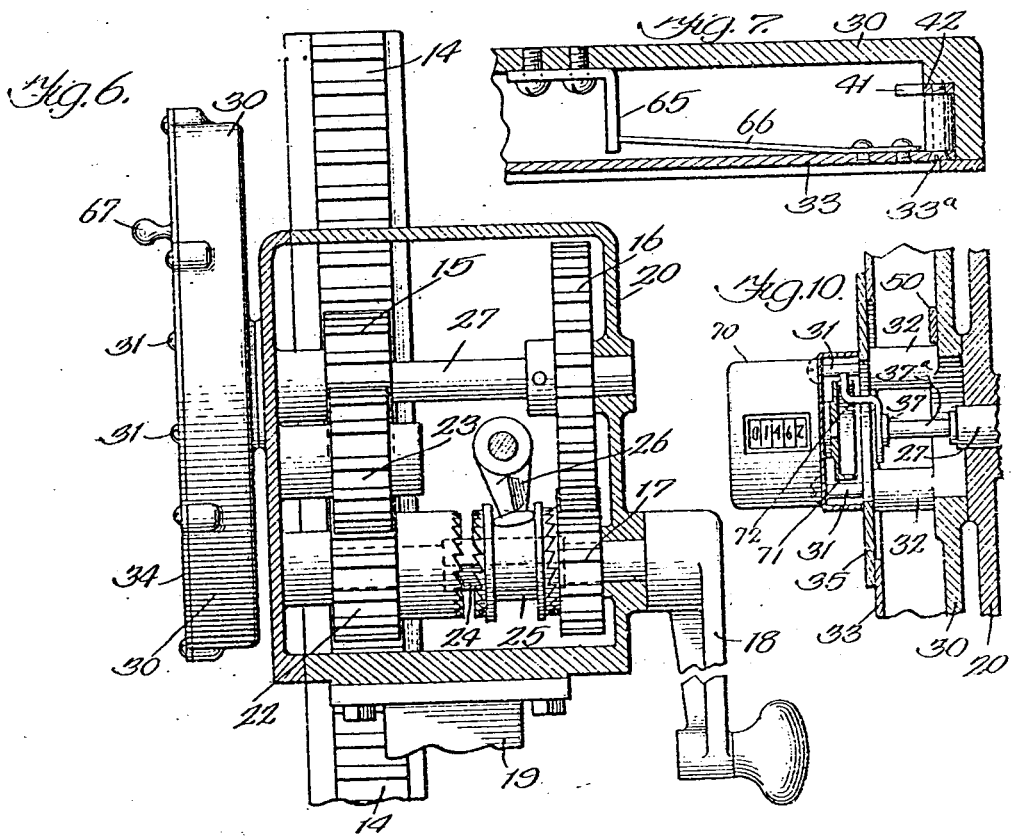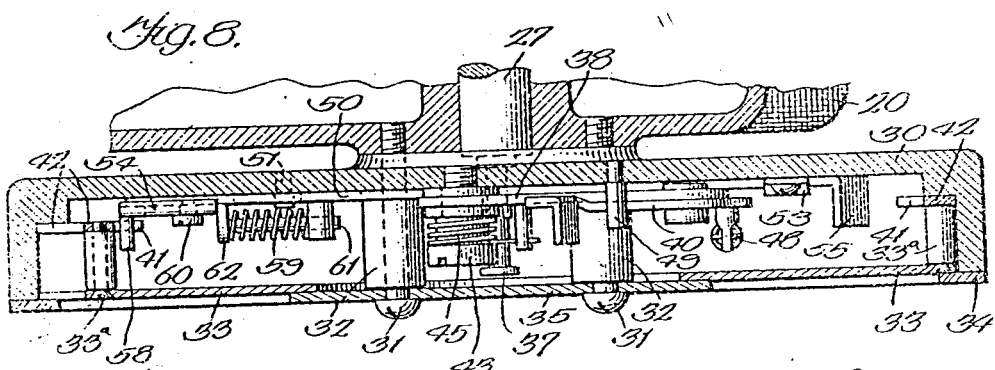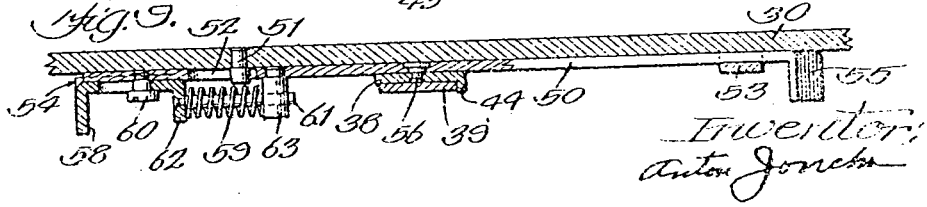

1,553,381

UNITED STATES PATENT OFFICE.

ANTON JONCHA, OF MELROSE PARK, ILLINOIS, ASSIGNOR TO OIL PRODUCTS APPLIANCE CO., OF MAYWOOD, ILLINOIS, A CORPORATION OF ILLINOIS.

INDICATOR FOR LIQUID-MEASURING AND DISPENSING PUMPS.

Application filed November 28, 1923. Serial No. 677,585.

*To all whom it may concern:*

Be it known that I, ANTON JONCHA, a citizen of the United States, and a resident of Melrose Park, Cook County, and State of Illinois, have invented certain new and useful Improvements in Indicators for Liquid-Measuring and Dispensing Pumps, of which the following is declared to be a full, clear, and exact description.

This invention relates to indicators for liquid measuring and dispensing pumps, and its primary object is to provide improved means for preventing dishonest attendants, or other parties, from tampering with the quantity indicators of measuring pumps of this character.

Most indicators for gasoline or oil measuring and dispensing pumps are capable of being advanced by hand during the process of dispensing the liquid, with the result that the purchaser of the liquid receives less than is indicated by the indicator. In accordance with the present invention the attendant can not advance the indicator except through the medium of the pump mechanism, whereby the purchasing public is always certain of obtaining the quantity indicated by the indicator. Another object is to provide an indicator which is positive in action, is simple in construction, and not likely to get out of order. Another object is to provide an indicator having a step by step movement, actuated by some member of the pump apparatus, and indicating at each successive step the quantity of liquid delivered.

With these and other objects and advantages in view, this invention consists in the several novel features hereinafter fully set forth and claimed.

The invention is clearly illustrated in the drawings accompanying this specification, of which:

Fig. 1 is a front elevation of a fragment of a liquid measuring and dispensing pump, illustrating one embodiment of the invention applied thereto; Fig. 2 is a front elevation, partly broken out, of the indicator mechanism; Fig. 3 is a vertical, cross section taken on the line 3—3 of Fig. 2; Fig. 4 is a view similar to Fig. 2 but showing the mechanism in a different position; Fig. 5 is a detail vertical, cross section taken on line 5—5 of Fig. 4; Fig. 6 is a view, partly in side elevation and partly in vertical cross section of certain elements of the pump mechanism and the indicator, the case for the pump mechanism being shown in section; Fig. 7, is a detail view, partly in section, of a spring detent, the section being taken on the line 7—7 of Fig. 2; Fig. 8 is a horizontal section taken on the line 8—8 of Fig. 2; Fig. 9 is a detail section taken on the line 9—9 of Fig. 2; and Fig. 10 is a fragmental side view, partly in vertical section, illustrating an additional improvement.

Referring to said drawings and first to Figs. 1 to 9, inclusive, the reference character 11 designates a fragment of the cylinder of a measuring and dispensing pump, 12 the delivery pipe, 13 the pump rod, 14 the rack bar, 15, 16, 17, a train of gear wheels and 18, a hand crank for actuating the pump rod, 19 designates a post or standard which is secured to and extends up from the pump cylinder, and supports the case 20 in which the gears 15, 16, 17 are enclosed. These parts are common and well known and constitute the usual mechanism for withdrawing gasoline or other liquid from a tank or reservoir. The invention is illustrated as applied to a continuous movement pump mechanism, wherein the hand crank 18 is rotated in the same direction to raise and lower the pump rod, and reversing gears 22, 23, are employed between the crank shaft 24 and gear wheel 15 for reversing the direction of rotation of said gear wheel to thereby move the rack bar 14 downward. A clutch mechanism 25 is interposed between the gear wheels 17, 22, and a shifting finger 26 is provided for the clutch collar of the clutch mechanism whereby the gear wheel 17, or 22 may be driven by the crank shaft 24. The shaft 27 which carries the gear wheel 15 that actuates the rack bar 14, is illustrated as the prime mover for the indicator mechanism, and each cycle of rotation of said shaft bears a certain predetermined relation to the quantity of liquid raised by the pump mechanism; for instance in the present instance for each one half revolution of said shaft 27, one quart of liquid is raised and delivered, and this amount is indicated by the dial, progressively, each time the shaft 27 is given one half a revolution. This relation between the movement of the pump shaft and indicator mechanism is taken for the purposes of illustration, only, as other relation may be selected as desired.

Mounted on the pump structure, as for instance, on the case 20 is an indicator casing 30 which may be secured thereto by screws or bolts 31, that pass through bosses 32 of the casing 30. Said casing contains the indicator mechanism, which in its present form includes a rotatory annular dial 33, that covers the open front of the casing. A ring 34, secured to the edge portion of the casing, covers the marginal edge of the dial, and a disc like plate 35 covers the central opening of the dial, the screws or bolts 31, serving to fasten the plate 35 to the bosses 32. The ring 34 and plate 35 secure the dial in the casing, although they permit it to rotate therein. Said dial 33 contains graduation marks along its margin and figures or characters indicating quantities; gallons and one fourth of gallons being indicated in the present instance. At the top the ring 33 is provided with a pointer 36 which indicates on the dial, the quantity of liquid withdrawn during the operation of the pump.

The actuating mechanism and locking mechanism for the indicator will now be described.

Secured to the drive or actuating shaft 27 is an actuating device 37, which in its present form, has two diametrically opposite pins 37$^a$, 37$^b$, that are secured to bars 37$^c$, one of which is fastened to the shaft 27 by screws. One pin, during each full one half revolution of the shaft 27, actuates certain detent and lock mechanism, and advances the dial one step to indicate withdrawals of liquids in quantities of one fourth of a gallon or one quart.

Adjacent the actuating device 37, is a pawl 38, which has a detent 39 that extends into the path of rotation of the pins 37$^a$, 37$^b$ and is actuated thereby. The pawl 38 has also a dog 40 secured thereon, which is arranged to engage with ratchet teeth 41 of a ring 42, which is secured to the dial 33, by screws and struts 33$^a$. The shaft 27 and actuating device 37 rotate in the direction indicated by the arrow in Figs. 2 and 3, and each time a pin 37$^a$ or 37$^b$ passes the detent 39 it swings the pawl 38 upward thereby engaging the dog 40 with a tooth of the ratchet ring 42 and advancing the same and therewith the dial, one step.

In its present form the pawl 38 is pivotally mounted on a pin or stud 43 secured on the casing 30, the detent 39 is pivotally mounted on the same pin or stud 43 and engages with a lug or shoulder 44 on the pawl 38 in a direction to swing the pawl upward on its working stroke. A spring 45 engages the pawl and detent and acts to hold the detent in engagement with the shoulder 44 of the pawl, but permits it to be swung back from the lug or shoulder whenever the actuating device 37 is turned backwards in lowering the pump rod. A pin 46 or other stop device, secured on the case, is placed below the pawl and limits its movement in its downward direction. The dog 40 is pivotally mounted on the pawl 38 as by a pin 47 and a spring 48 secured to the dog 40 and casing 30 acts to normally hold the pawl 38 against the pin 46, and to swing the operative end of the dog toward the teeth of the ratchet ring 42. A pin or guide 49, secured to the casing, coacts with the dog to hold the dog away from the ratchet ring, and against the action of the spring 48, except when the pawl 38 is swung into action, whereupon the pin 49 guides the dog 40 toward a tooth of the ratchet ring. As shown the dog 40 has a cam 40$^a$ formed thereon which coacts with the pin 49 to properly guide the dog 40 toward and away from the ratchet ring. Fig. 2 shows, in full lines, the position of the parts at the start of any cycle of operation, and in dotted lines, the position of the parts when a pin (37$^b$) has encountered and moved the detent, pawl and dog into the position where the dog is ready to engage and advance the ratchet ring, and therewith the dial, one step, and Fig. 4 shows the parts in the position occupied at the moment the pin (37$^b$) rides off the detent, 39, the dog 38 at this time having advanced the ratchet ring one step, and having been disengaged from the tooth with which it was engaged while advancing the ratchet ring.

From the above, it is apparent that each time a pin 37$^a$ or 37$^b$ encounters and actuates the detent 39, the dog 40 is engaged with a tooth of the ratchet ring, and the latter is advanced one step. When the pin (37$^b$) rides off the detent the pawl mechanism is returned to normal position (shown on full lines in Fig. 2) by the spring 48.

To prevent a dishonest attendant from advancing the dial at any time, locking mechanism is provided for holding the ratchet ring, and therewith the dial, against forward movement. This mechanism will now be described.

Slidably mounted on the casing 30 is a lock bar 50, which as shown, is guided to move lengthwise of itself by a pin and slot connection 51, 52, at one end, and a guide strap 53 at the other. When the indicator mechanism is at rest, the end 54 of the lock bar is engaged with the teeth of the ratchet ring 42, and the end 55 is disengaged therefrom. The ends of the ratchet teeth are beveled, which permits the dial 33 and therewith the ratchet ring 42 to be manually rotated in backward or reverse direction, namely one opposite to the direction of movement imparted to them by the indicator mechanism.

The ends of the lock bar are beveled to correspond with the beveled edges of the ratchet teeth 41.

The lock bar is reciprocated by the pawl 38 and its ends are alternately engaged with the ratchet teeth of the ring 42, whereby one end is always in position to prevent a dishonest attendant from turning the dial ahead. The connection between the pawl 38 and lock bar 50 is shown as comprising a pin 56. Fig. 2 shows the lock bar in position with its end 54 in engagement with the ratchet ring 42 and Fig. 4 shows the end 55 of the lock bar in engagement with the ratchet ring. In Fig. 4 the ring is shown in a position occupied when moved one step beyond the position illustrated in Fig. 2.

To permit the attendant to turn the dial back to the zero point thereon, the end 54 of the lock bar is in the form of a pawl or dog 58 mounted on the lock bar in such manner that it may yield when the ratchet ring is rotated in the direction of the arrow X, thereon, in Fig. 2, but not when an attempt is made to manually turn the dial and ratchet ring in the other direction. The yielding connection between the pawl 58 and lock bar is shown as formed by slidably mounting the pawl 58 on the lock bar and interposing a spring 59 behind it. As shown the pawl 58 is slotted lengthwise of itself and a screw 60 extends through the slot and is threaded in the bar. A pin 61 secured in an ear 62 of the pawl 58 is guided in a post 63 on the bar, and the coiled compression spring 59 encircles the pin 61 between the ear 62 and post 63. The spring 59 yieldingly holds the pawl 58 in engagement with the ratchet ring until the end 54 of the lock bar is entirely disengaged from the ratchet ring, as shown in Fig. 4 but at this time, its end 55 becomes engaged with the ratchet ring, and prevents movement of the dial in its forward direction.

Secured upon the casing 30 is a lug 65 which forms a stop for a spring pawl or detent 66 which is secured to the dial 33. This stop device is located in position to stop the dial when moved back until the zero point thereof registers with the pointer 36. A knob 67 on the dial furnishes means for turning the dial back to the zero point. The toothed ring 42 and locking bar 50 cooperate in the manner of an escapement mechanism, and in the claims will be designated as such.

In operation, the attendant turns the crank 18 thereby drawing off the liquid. The drive shaft 27 thereupon rotates in the direction indicated by the arrow in Figs. 2 and 4 and rotates the pins 27$^a$, 27$^b$ about the axis of said shaft. Each pin encounters the detent 39 and swings the pawl 38 upward, bringing the dog 40 into engagement with a tooth 41 of the ratchet ring 42 and advancing it, and therewith the dial 33, one step, indicating that one fourth of one gallon has been withdrawn from the tank. During the up stroke of the pawl 38, the lock bar 50 is moved out of the engagement with the teeth at the end 54 and into engagement with a tooth at the end 55, but because of the play in the guide strap 53, the lock bar may swing upward, through a limited extent, with the ratchet ring, but it prevents the ring from being advanced beyond the point that the dog has advanced it. When the pin rides off the detent 39 the spring 48 retracts the dog, pawl and detent to normal position, and the pawl, through its engagement with the lock bar, retracts the latter and reengages the end 54 with the ratchet ring, thereby preventing the attendant or others from advancing the dial. When the desired quantity, as shown by the dial, has been withdrawn, the clutch 25 is shifted, and the rack bar 14 and pump rod 13 lowered, during which time the pins 37$^a$, 37$^b$ rotate in the reverse direction to that in which they moved while actuating the indicator mechanism. While rotating in this reverse direction, the pins swing the detent 39 back against the action of the spring 45 without effecting the indicator mechanism.

The dial is turned back to the zero point by hand, the attendant taking hold of the knob 67 and turning the dial backwards until the spring 66 encounters the stop 65.

In Fig. 10 is shown a register 70 which indicates the total quantity withdrawn from the tank or reservoir. Said register may be of any of the common and well known types of registers having a rotary element 71 as the prime mover thereof. In this case the register is secured to the plate 35, and the actuating device 37 is shown as provided with an arm 72 which engages and actuates the prime mover 71. A ratchet mechanism between the prime mover and register mechanism permits retrograde movement of the arm 37 and prime mover 71 without effecting the register.

From the above, it is evident that the dial cannot be manipulated to indicate a greater quantity than that withdrawn.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. In an indicator for liquid measuring and dispensing pumps, the combination of a quantity indicating member, actuating means for intermittently advancing said quantity indicating member to indicate quantities dispensed, including a toothed escapement element fixedly secured to and moving with said quantity indicating member, and a reciprocatory escapement member co-acting therewith to lock the quantity indicating member against forward movement independent of that imparted to it by said actuating means, said escapement member having a yielding element normally lockingly engaging a tooth of said escapement element to prevent forward movement, and a member of said actuating means having means for reciprocating said escapement member.

2. In an indicator for liquid measuring and dispensing pumps, the combination of a quantity indicating member, actuating means, including pawl and ratchet mechanism for intermittently advancing said quantity indicating member to indicate quantities dispensed, the ratchet being fixedly secured to and moving with said quantity indicating member, and a reciprocatory escapement member co-acting with the ratchet to lock the quantity indicating member against forward movement independent of that imparted to it by said pawl, said escapement member having a yielding element normally lockingly engaging a tooth of said ratchet, and a member of said actuating means having means for reciprocating said escapement member.

3. In an indicator for liquid measuring and dispensing pumps, a quantity indicating member, actuating means for intermittently advancing said quantity indicating member to indicate quantities dispensed, and a reciprocatory lock bar, the ends of which are arranged to engage alternately with a member of said actuating mechanism for locking said quantity indicating member against forward movement independent of that imparted to it by said actuating means, said lock bar having a yielding element lockingly engaging said member of the actuating mechanism, and said actuating means being operatively connected to said lock bar and arranged to reciprocate the same.

4. In an indicator for liquid measuring and dispensing pumps, the combination of a quantity indicating member, actuating means including pawl and ratchet mechanism for intermittently advancing the quantity indicating member, and a lock bar actuated by the pawl of said pawl and ratchet mechanism, the ends of said lock bar being arranged to engage, alternatively with the ratchet of said pawl and ratchet mechanism, and one end of said lock bar having a spring pressed pawl for engagement with the ratchet.

5. In an indicator for liquid measuring and dispensing pumps, the combination of a quantity indicating member, a ratchet ring secured to said quantity indicating member, a pawl cooperating with said ratchet ring to intermittently advance said ratchet ring and therewith the quantity indicating member, a rotary driving element having pawl actuating means, and a lock bar actuated by said pawl and having ends arranged to engage alternatively with said ratchet ring.

6. In an indicator for liquid measuring and dispensing pumps, the combination of a quantity indicating dial, a rotatory driving element having pawl engaging means, a pawl intermittently operated by said driving element, a ratchet ring secured to said quantity indicating dial, and cooperating with said pawl, and lock mechanism operating normally to lock said dial against movement in an advance direction, and having an element for limiting movement of the ratchet member of said pawl and ratchet mechanism one step only at a time, each time the pawl and ratchet ring are actuated by said driving element.

7. In an indicator for liquid measuring and dispensing pumps, the combination of a rotatory drive element, a quantity indicating member, actuating means therefor, including pawl and ratchet mechanism operated by said driving element for intermittently advancing said quantity indicating member to indicate the quantities dispensed, the pawl of said pawl and ratchet mechanism having a spring pressed dog for engaging the teeth of the ratchet of said ratchet mechanism, and an escapement member actuated by the pawl of said pawl and ratchet mechanism and cooperating therewith to lock said quantity indicating member against forward movement independent of that imparted to it by said driving means.

8. In an indicator for liquid measuring and dispensing pumps, the combination of a quantity indicating member, a ratchet ring secured thereto, a pawl having a spring actuated dog pivotally mounted thereon and arranged to engage said ratchet when pawl is actuated, a stationary pin arranged to engage said dog and normally hold said dog out of engagement with the ratchet ring, a pawl actuated escapement mechanism member actuated by said pawl and cooperating with said ratchet ring to lock said quantity indicating member against forward movement independent of that imparted to it by said driving element.

9. In an indicator for liquid measuring and dispensing pumps, the combination of a quantity indicating dial, actuating means for intermittently advancing said quantity indicating dial to indicate quantities dispensed, and an escapement mechanism member actuated by a member of said actuating means, said actuating means including an escapement element fixedly secured to said quantity indicating dial and cooperating with said escapement mechanism member to lock the quantity indicating dial against forward movement independent of that imparted to it by said actuating means.

ANTON JONCHA.